Jan. 21, 1936.                H. T. BOOTH                2,028,186
                        VISCOSITY RESPONSIVE DEVICE
                           Filed Feb. 7, 1933           3 Sheets-Sheet 1
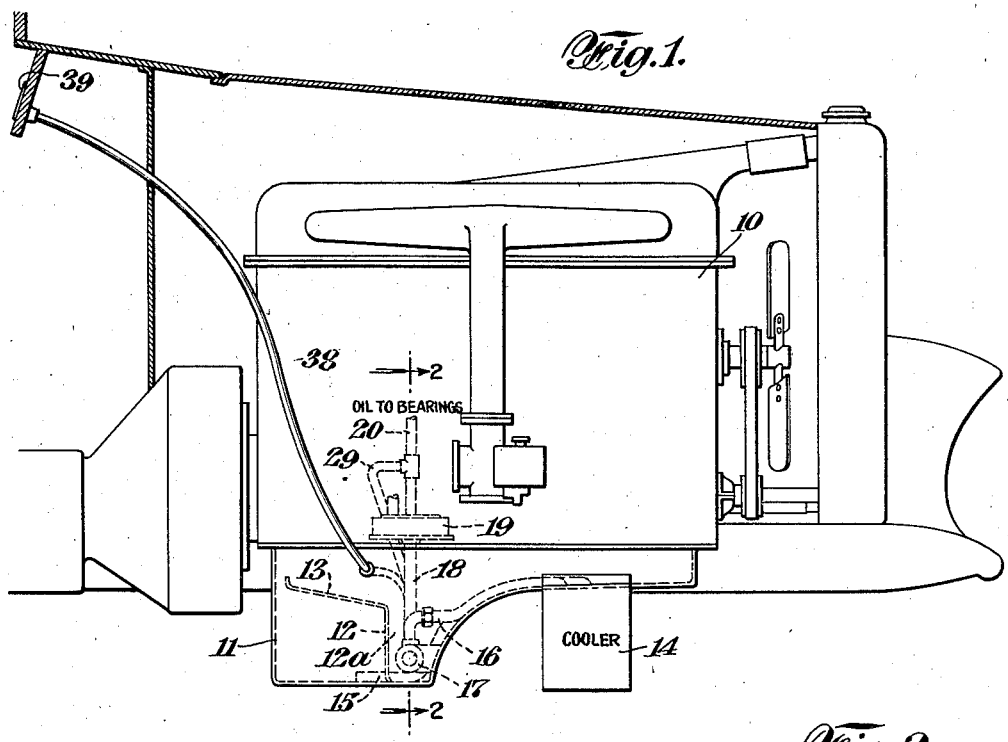
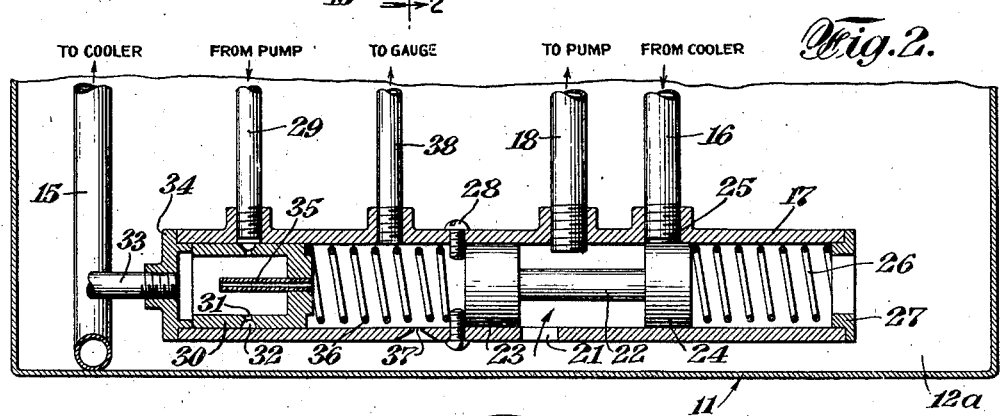
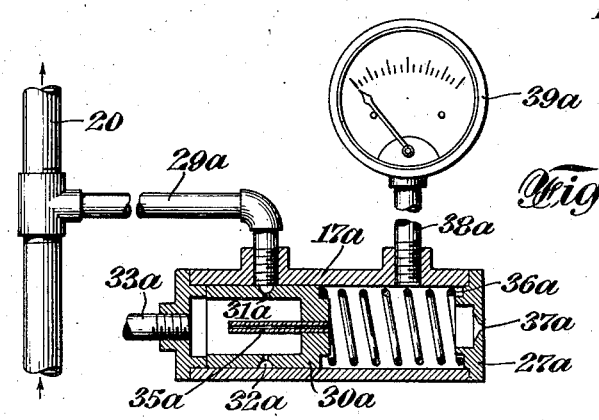
INVENTOR
Harry T. Booth
BY
Kenyon & Kenyon
ATTORNEYS.

Jan. 21, 1936.  H. T. BOOTH  2,028,186
VISCOSITY RESPONSIVE DEVICE
Filed Feb. 7, 1933  3 Sheets-Sheet 2

INVENTOR
Harry T. Booth
BY
Kenyon & Kenyon
ATTORNEYS

Jan. 21, 1936.                H. T. BOOTH                2,028,186
                        VISCOSITY RESPONSIVE DEVICE
                          Filed Feb. 7, 1933              3 Sheets-Sheet 3

INVENTOR
Harry T. Booth
BY
Kenyon & Kenyon
ATTORNEYS.

Patented Jan. 21, 1936

2,028,186

UNITED STATES PATENT OFFICE 2,028,186

VISCOSITY-RESPONSIVE DEVICE

Harry T. Booth, Detroit, Mich., assignor to Lubrication Control Corporation, Chicago, Ill., a corporation of Delaware Application February 7, 1933, Serial No. 655,574

17 Claims. (Cl. 137—165)

This invention relates to viscosity-responsive devices and has for an object a simple and efficient device responsive to variations in viscosity of fluid flowing through said device.

In a device embodying the invention, the fluid is caused to pass successively through two ports, one comprising a friction tube, the resistance of which to fluid flow varies with variations in viscosity of the fluid and the other comprising an orifice, the resistance of which to fluid flow is substantially independent of the viscosity of the fluid, these ports being arranged in either of two orders of succession. Means are provided for maintaining constant pressure differential across the first port and the pressure of the fluid between the two ports or the pressure of the fluid supplied to the first port is applied to pressure-responsive means which may be a control member or an indicator. The pressure of the fluid between the two ports and also the pressure of the fluid supplied to the first port is a function of the viscosity of the fluid and the control member or indicator is operated in response to changes in viscosity of the fluid.

Such a viscosity-responsive device is of utility in connection with any fluid system in which the viscosity of the fluid requires regulation, but is of particular utility in connection with the lubricating system of an internal combustion engine to control the viscosity of the lubricant as described and claimed in the co-pending application of Henry B. Clarke, Serial No. 644,287, filed November 25, 1932, and is also of utility for directly measuring and indicating the viscosity of liquid flowing through the device.

Other objects, novel features and advantages of this invention will be apparent from the following specification and accompanying drawings, wherein:

Fig. 1 is a side elevation of an automobile engine having a lubricating system embodying the invention;

Fig. 2 is an enlarged fragmentary section on the line 2—2 of Fig. 1;

Fig. 3 is a sectional view through a viscosimeter embodying the invention; and

Figure 4:
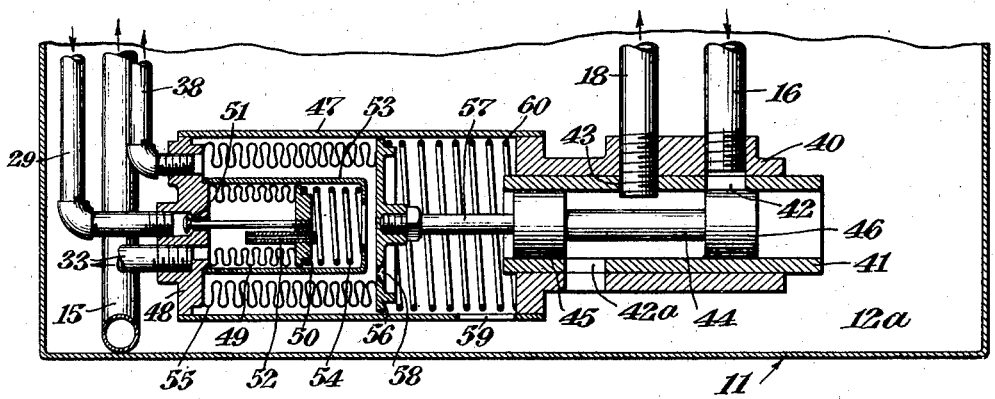
Figs. 4, 5, 6, 7 and 8 are views similar to Fig. 2 of modified forms of the invention.

The internal combustion engine 10 is provided with an oil pan 11, the forward portion of which is of less depth than the rear portion. A vertical partition 12 forms a well or pocket 12a with the curved bottom of the forward portion of the oil pan, this partition terminating in a sloping shelf 13 extending nearly to the rear wall of the pan. The bottom edge of the partition 12 engages the bottom of the oil pan, but does not make a fluid tight seal therewith. A heat exchange device or radiator 14 is suspended from the bottom of the oil pan adjacent the front end thereof. A pipe 15 leads from the chamber formed by the partition 12 and the shelf 13 to the radiator 14 and a pipe 16 leads from the radiator to a casing 17 arranged in the well 12a.

From the casing 17, a pipe 18 leads to the intake of an oil pump 19 and a pipe 20 delivers oil from the pump to the bearings. The casing 17 is provided with an inlet port 21 communicating with the well 12a and a piston valve 22 having heads 23 and 24 is slidably mounted in the casing for controlling flow of oil into the casing 17 through the pipe 16 and the port 21. The piston valve 22 is so designed that in one position thereof the head 24 closes the port 25 through which the pipe 16 discharges into the casing with the head 23 out of register with the port 21 while in another position the head 23 closes the port 21 with the head 24 out of register with the port 25. A spring 26 interposed between the head 24 and the hollow plug 27 closing the right end of the casing 17 tends to hold the piston 22 in the position shown in Fig. 2 with the head 23 abutting the projecting inner ends of screws 28 which constitute stop members.

A branch pipe 29 leads from the pipe 20 to the left end of the casing 17. A skirted piston 30 is slidably mounted in the casing 17 and the skirt is provided with radial ports 31 which communicate with a peripheral groove 32 in the outer face of the skirt. The position of this piston with respect to the pipe 29 controls the flow of oil through said pipe into the interior of the piston. The piston 30 is provided with a friction tube 35 which extends through the head of the piston and delivers oil from one side of the piston to the other. A spring 36 is interposed between the piston 30 and the screws 28, the spring tending to maintain the piston in the position shown in Fig. 2 with the peripheral groove 32 fully in register with the pipe 29. An orifice 37 in the casing 17 provides a port for escape of oil from the space between the piston 30 and the head 23 into the well 12a, the rate of flow through the orifice being the same as that through the friction tube.

The friction tube 35 is of such dimensions that its resistance to fluid flow varies with the viscosity of the fluid while the orifice 37 is of such dimensions that its resistance to fluid flow is substantially independent of the viscosity of the fluid and, as will later be described the pressure differential across the friction tube is maintained substantially constant. As the pressure differential across the friction tube is maintained constant, the rate of flow through the friction tube varies inversely with viscosity, and as the resistance to flow of the orifice is dependent upon rate of flow and independent of viscosity and as the rate of flow through the orifice is the same as through the friction tube, the pressure of the oil in the space between the piston 30 and head 23 is a measure of the rate of flow through the friction tube and is a function of the oil viscosity.

When the engine is at rest, the various elements are in the position shown in Fig. 2. The peripheral groove 32 is in full register with the pipe 29 and the port 21 is open while the port 25 is closed and all the chambers and spaces within the casing 17 are filled with oil. On starting of the engine, oil is drawn in through the port 21 and delivered to the bearings. Also, oil is forced by way of the pipe 29 into the piston 30, thence through the friction tube 35 and orifice 37 into the well 12a. The increased pressure thus produced at the left of the piston 30 tends to move the same to the right against the back pressure resulting from the resistance of the orifice 37 and the pressure of the spring 36. Such movement of the piston cuts down the oil flow through the ports 31 and continues until the difference in pressure on the opposite sides of the piston and consequently the pressure differential across the friction tube 35 equals the strength of the spring 36 and such relationship is maintained throughout the entire operation by regulatory movement of the piston back and forth in its cylinder. The pressure differential across the friction tube is thus maintained substantially constant.

When the oil is of high viscosity as is the case upon starting of the engine, the rate of flow through the friction tube 35 is low by reason of the high resistance of the friction tube to flow of oil of high viscosity and consequently the back pressure in the space between the piston 30 and the head 23 is low and is insufficient to overcome the force exerted by the spring 26. Therefore, the piston 22 remains in the position shown in Fig. 2 with the port 25 closed and the port 21 opened. With this arrangement of the piston, the by-pass through the radiator 14 is closed and oil is drawn by the pump solely from the well 12a. After a period of operation, the oil becomes of higher temperature and consequently of lower viscosity. Therefore, with the constant pressure differential across the piston tube 35, the rate of flow therethrough increases as the viscosity decreases. Such increase in flow results in an increased back pressure in the space between the piston 30 and head 23 and the piston 22 is pushed to the right against the action of the spring 26, thereby partially closing the port 21 and partially opening the port 25. In this position of the piston 22 oil is drawn through the radiator 14 as well as directly from the well 12a and the mixture thus obtained is supplied by the pump to the bearings. The addition of cool oil tends to impede further viscosity decrease. Movement of the piston to the right continues until the oil supplied to the bearings is of predetermined viscosity or the head 23 engages the pipe 18 to stop its further movement. As soon as the oil reaches the predetermined viscosity further movement of the valve to the right ceases and the ratio of oil drawn directly from the sump and through the radiator remains constant.

Any decrease in viscosity of the lubricant due to change of engine speed or other cause is immediately compensated for by movement of the valve 22 to the right to increase the flow of oil through the by-pass, thereby tending to increase the ratio of cooled oil in the mixture. Any increase in viscosity is compensated for by movement of the valve 22 to the left to decrease the flow of oil through the radiator, thereby tending to decrease the ratio of cooled oil in the mixture. Such regulatory movement of the valve maintains the oil at predetermined viscosity.

The viscosity at which the oil is maintained is dependent upon the spring 26. This spring prevents any movement of the valve 22 until such time as the pressure exerted by the oil against the head 23 exceeds the strength of the spring, and moves the piston to the left as soon as such pressure decreases below such strength, and as the pressure exerted on the head 23 is a function of the viscosity of the oil, the spring 26 is designed to be of proper strength to insure maintenance of the oil at the desired viscosity.

If desired, a pressure responsive indicator 39 suitably calibrated to give direct viscosity readings may be connected through the pipe 33 to be acted upon by oil supplied to the friction tube 35 or through the pipe 38 to be acted upon by the oil between the friction tube 35 and orifice 37. As the pressure differential across the friction tube 35 is maintained constant, the pressure of the oil supplied to the friction tube, as well as the pressure of the oil between the friction tube and orifice is a function of the oil viscosity and the viscosity of the oil at any time may be read directly from the indicator which will be differently calibrated according to which connection is used.

The viscosimeter shown in Fig. 3 embodies the same principle of construction as above described. The pipe 29a leads from the pipe 20 to the casing 17a in which is slidably mounted a skirted piston 30a having radial ports 31a communicating with a peripheral groove 32a. The piston 30a carries a friction tube 35a and a spring 36a is interposed between the piston 30a and the plug 27a closing the right end of the casing. An orifice 37a is provided in the plug 27a and either a pipe 33a or a pipe 38a leads from the casing 17a to a pressure responsive indicator 39a suitably calibrated to give direct readings of viscosity. Constant pressure differential is maintained across the friction tube 35a as previously described and the pressure of the oil in the space between the piston 30a and plug 27a is a function of the viscosity of the oil. As the indicator 39a is acted upon by the pressure of the oil in the space between the piston 30a and plug 27a, it will give direct readings of viscosity of the oil flowing through the device.

In the modification disclosed in Fig. 4, the pipes 16 and 18 lead to and from a casing 40 provided with a cylindrical liner 41 having ports 42 and 43 registering with the pipes 16 and 18 and having a port 42a communicating with the interior of the well 12a. A piston 44 having heads 45 and 46 is slidably mounted in the liner 41 and is adapted to control flow into the liner through the ports 42 and 42a. A housing 47 extends from the left end of the casing 40 and its left end is closed by a plug 48. A bellows member 49 is attached at one end to the inner face of the plug 48 and its other end is closed by a head 50. The plug 48 is provided with an inlet port controlled by a valve 51, the stem of which is carried by the head 50. A friction tube that disclosed in Fig. 6 in that the piston 30 is provided with an orifice 37 while the piston 71 is equipped with a friction tube 35. In this modification, constant pressure differential is maintained across the orifice 37. The rate of flow through the orifice 37 is maintained substantially constant since the resistance of the orifice to flow is substantially independent of viscosity. As the rate of flow of oil through the orifice 37 and the friction tube 35 is the same and as the resistance of the tube 35 to flow varies with viscosity, it follows that the pressure required to flow the oil through the tube 35 varies with viscosity of the oil. Therefore, the back pressure in the space between the pistons 30 and 71 is a measure of the rate of flow and is a function of the viscosity. The piston 71, together with the piston 22 is caused to move to the right against the action of the spring 26 as the viscosity increases and to the left under the action of the spring 36 as the viscosity decreases, thereby tending to maintain constant the viscosity of the oil supplied to the bearings.

Figure 8:
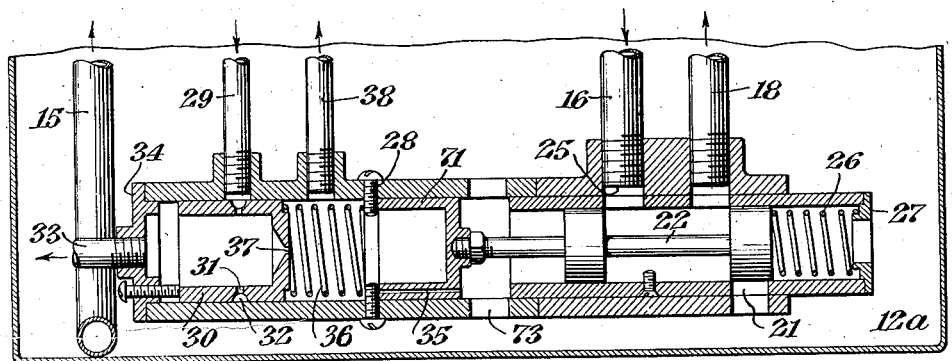

When the engine is at rest, the parts are in the position shown in Fig. 8. When the engine is started, the viscosity of the oil is high and therefore the back pressure resulting from the resistance of the friction tube 35 is high and the piston 71 is immediately moved to the right to open the port 21 and close the port 25 so that oil is drawn by the pump solely from the well 12a. As the temperature of the oil rises and the viscosity decreases, the pressure on the piston 71 decreases correspondingly and allows the spring 26 to move the pistons 22 to the left, thereby partially closing the port 21 and partially opening the port 25, such movement continuing until the desired viscosity is obtained after which changes in viscosity are compensated for by movement of the valve 22 to the right or left to change the ratio of warm and cool oil supplied to the pump. If desired, the viscosity indicator 39 may be connected through the pipe 33 to be acted upon by oil supplied to the orifice 37 or through the pipe 38 to be acted upon by oil between the orifice 37 and friction tube 35 for the purpose of obtaining direct viscosity readings.

In each of the devices above described, the space between the friction tube and orifice constitutes a chamber having an inlet port comprising either the friction tube or orifice and an outlet port comprising either the orifice or friction tube. The pressure of the oil in this chamber is a function of the viscosity of the oil and is utilized either to actuate a valve for controlling flow of cool and warm oil to the pump to make up the mixture to be supplied to the bearings, or to actuate an indicator which registers the viscosity of the oil or to operate both the valve and the indicator. In all of the devices shown, one wall of the chamber is movable in response to pressure changes in the chamber to control the flow of oil to the inlet port to maintain constant the pressure differential across the port. In Figs. 2, 4, 5, 6 and 8, the other wall of the chamber is movable in response to pressure changes within the chamber and is conjunctively related to the valve for actuating the same. In the last named figures, a viscosity indicator is shown as combined with the valve controlling means, but it is to be understood that the indicator is in no way essential to the proper functioning of the valve control means and may be eliminated. In fact, it is probable that in most installations of the devices shown in these figures, the indicator will be eliminated as the control means maintains the oil at a predetermined viscosity. The pressure indicator 39 will be differently calibrated according to whether it is connected ahead of the inlet or between the inlet and outlet as the pressure of the oil at the inlet varies from the pressure of the oil in the chamber equal to the pressure differential across the inlet. In Fig. 7, a chamber is provided ahead of the first port and has a movable wall which actuates the control valve, the pressure in the chamber being a function of the oil viscosity as such pressure bears a constant relation to the pressure of the oil between the friction tube and orifice.

It is of course understood that various modifications may be made in the structure above described, without in any way departing from the spirit of the invention as defined in the appended claims.

I claim:

1. In a fluid system, two fluid paths, a heat exchange device in one path, a conduit with which said paths communicate, valve means for controlling flow through said paths, a chamber having inlet and outlet passages, one of said passages comprising a friction tube and the other passage comprising an orifice, said inlet passage being in communication with said conduit, means for maintaining constant pressure differential across said inlet passage, and means for actuating said valve means to response to pressure variations at one side of said inlet passage.

2. In a fluid system, two fluid paths, a heat exchange device in one path, a conduit with which said paths communicate, valve means for controlling flow through said paths, a chamber having inlet and outlet passages, one of said passages comprising a friction tube and the other passage comprising an orifice, said inlet passage being in communication with said conduit, means for maintaining constant pressure differential across said inlet passage, and means for actuating said valve means in response to pressure variations in the fluid in said chamber.

3. In a fluid system, two fluid paths, a heat exchange device in one path, a conduit with which said paths communicate, a valve movable to and fro to control flow through said paths, a chamber having inlet and outlet passages, one of said passages comprising a friction tube and the other passage comprising an orifice, said inlet passage being in communication with said conduit, means for maintaining constant pressure differential across said inlet passage, said chamber having a movable wall conjunctively related to said valve, and means for opposing movement of said movable wall and valve in one direction.

4. In a fluid system, two fluid paths, a heat exchange device in one path, a tubular casing communicating with said paths, a piston slidably mounted in said casing to control flow through said paths, one end of said piston co-operating with a portion of said casing to form a chamber, said chamber having inlet and outlet passages of which one is a friction tube and the other an orifice, a conduit with which said casing communicates, said inlet passage being in communication with said conduit, means for maintaining constant pressure differential across said inlet passage, and means for opposing movement of the piston in one direction.

5. In a fluid system, two fluid paths, a heat exchange device in one path, a tubular casing communicating with said paths, a piston slidably mounted in said casing to control flow through 52 is carried by and extends through the head 50. A cylindrical frame 53 surrounds the bellows and supports a spring 54 which bears against the head 50. A second bellows member 55 is attached at one end to the plug 48 and is closed at its other end by a plate 56. This plate is connected by a link 57 with the piston 44 and is provided with an orifice 58. The housing 47 is provided with an aperture 59 and a spring 60 is interposed between the left end of the casing 40 and the plate 56.

In operation, oil is drawn by the pump through the ports 42 and 42a according to the position of the piston 44 and a portion of the oil discharged by the pump is supplied through the pipe 29 to the interior of the bellows 49; the oil then flows through the friction tube 52 and through apertures in the frame 53 into the bellows 55 from which it escapes through the orifice 58 and port 59 to the well 12a. Constant pressure differential is maintained across the friction tube 52 by operation of the valve 51 against and under the action of the spring 53. The pressure in the bellows 55 acts to expand the same and to move the plate 56 against the action of the spring 60, thereby controlling the position of the valve 44 and regulating the flow of oil directly from the well 12a and through the radiator 14 to the pump. As above explained, the pressure of the oil between the friction tube and the orifice is a function of the viscosity of the oil. The viscosity of the oil supplied to the bearings is maintained uniform by the regulatory movement of the piston 44 in response to changes in pressure acting on the plate 56. If desired, a suitably calibrated pressure-responsive indicator 39 may be connected either through the pipe 33 to the interior of the bellows 49 or through pipe 38 with the interior of the bellows 55 for the purpose of obtaining direct readings of the viscosity of the oil.

Figure 5:
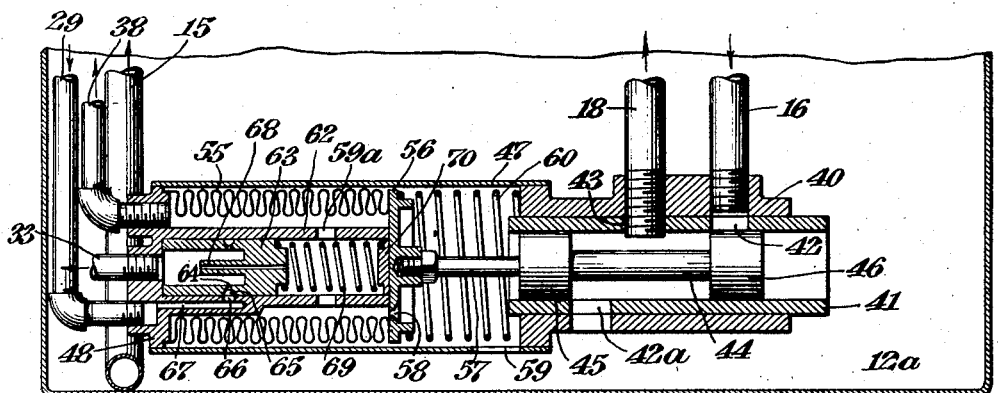

In the modification disclosed in Fig. 5, oil is supplied to the pump either from the well 12a through the port 42a or by way of the radiator 14 through the pipe 16 and port 42 according to the position of the piston 44. The casing 47 is closed by a head 4d having a tubular portion 62. A skirted piston 63 is slidably mounted in the portion 62 and is provided with radial ports 64 communicating with the peripheral groove 65 which in turn communicates with a port 66 in the tubular member 62 leading from a conduit 67 into which the pipe 29 discharges. The piston 63 is provided with a friction tube 68 extending through the head of the piston and a spring 69 is interposed between the piston and a plug 70 closing the end of the tubular portion 62. A bellows 55 is attached at one end to the plug 48 and is closed at its other end by a head 56. The head 56 is connected by a link 57 with the piston 44 and is provided with an orifice 58. A spring 60 is interposed between the head 56 and the casing 40 and a port 59 is provided for the escape of oil from the housing 57. Ports 59a are also provided in the tubular portion 62 to permit passage of oil into the bellows 55. In operation, constant pressure differential is maintained across the friction tube 68 by movement of the piston 63 against and under the action of the spring 69 and oil escaping from the friction tube flows through the ports 59a into the bellows 55 and thence through the orifice 58 and aperture 59 into the well 12a. The pressure within the bellows 55 is a function of the viscosity of the oil as previously described and this pressure effects regulatory movement of the piston 44 in combination with the spring 60 as previously described. If desired, the viscosity indicator may be connected through the pipe 33 with the tubular portion 62 or through the pipe 38 with the bellows 55 for the purpose of giving readings of the viscosity of the oil.

Figure 6:
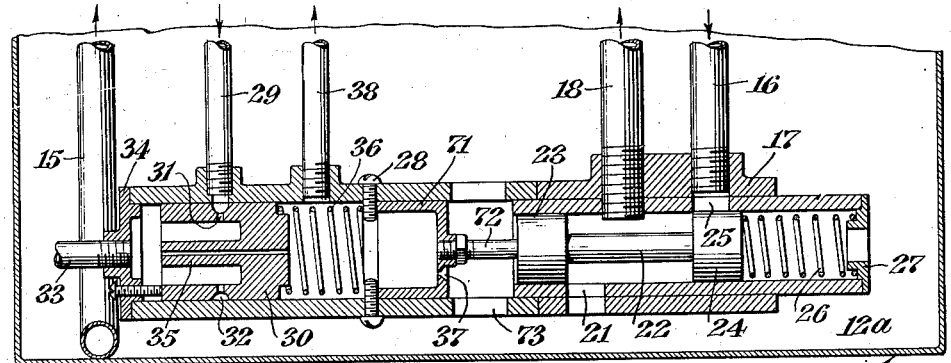
Figure 7:
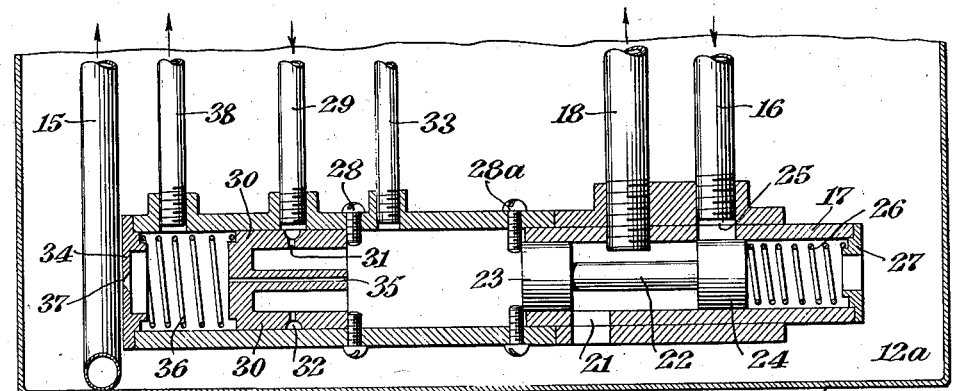

The structure disclosed in Fig. 6 is generally similar to the structure disclosed in Fig. 2. However, instead of having the oil after passing through the friction tube engage the head 23 of piston 22, there is provided in the casing 17 an additional piston 71 which is connected by a link 72 with the head 23 of the piston 22. This piston is provided with an orifice 37 through which oil passes into the space between the piston 71 and the head 23. Ports 73 are provided in the casing 17 to permit the oil to flow back into the well 12a.

In this modification, the flow through the ports 21 and 25 to the pipe 18 is controlled by the position of the piston 22 which is moved to regulate flow in response to changes in pressure of the oil against the piston 71. Constant pressure differential is maintained between the ends of the friction tube 35 through movement of the piston 30 against and under the influence of the spring 36 and again, the pressure of the oil in the space between the pistons 30 and 71 is a function of the viscosity and the piston 22 is actuated in response to changes in viscosity to correct such changes and tend to maintain constant viscosity in the oil supplied to the bearings. If desired, a suitably calibrated viscosity indicator 39 may be connected through the pipe 33 to be acted upon by oil supplied to the friction tube 35 or through the pipe 38 to be acted upon by oil between the friction tube 35 and orifice 37 for the purpose of obtaining viscosity readings.

In the modification disclosed in Fig. 7, the branch pipe 29 communicates with the left end of the casing 17 in which is slidably mounted a skirt piston 30 oppositely faced from the piston arrangement in Fig. 2. Screws 28 and 28a act as stops for the piston 30 and the piston valve 22. The piston 30 is provided with a friction tube 35 which extends through the head of the piston and delivers oil from one side of the piston to the other and a spring 36 is interposed between the piston 30 and the left end 34 of the casing 17. An orifice 37 in the end 34 of the casing provides a port for escape of oil from the space between the piston 30 and the end 34 into the well 12a.

As previously explained the pressure differential across the friction tube is maintained constant by regulatory movement of the piston 30 and the pressure of the oil in the space between the friction tube and the orifice is a measure of the rate of flow through the friction tube and is a function of the oil viscosity. As the pressure differential across the friction tube is maintained constant, the pressure in the oil between the piston 30 and the head 23 is likewise a function of the oil viscosity. In this modification, the viscosity of the oil supplied to the bearings is maintained uniform by regulatory movement of the piston 22 in response to changes in pressure between the piston 30 and the head 23 of the piston valve 22. If desired, a suitably calibrated viscosity indicator 39 may be connected through the pipe 33 to be acted upon by oil supplied to the friction tube 35 or through the pipe 38 to be acted upon by oil between the friction tube 35 and the orifice 37.

The modification disclosed in Fig. 8 differs from said paths, a movable member in said casing forming a chamber and being conjunctively related to said piston, said chamber having inlet and outlet passages of which one is a friction tube and the other an orifice, a conduit with which said casing communicates, said inlet passage being in communication with said conduit, means for maintaining constant pressure differential across said inlet passage, and means for opposing movement of the piston in one direction.

6. In a fluid system, two fluid paths, a heat exchange device in one path, a casing communicating with said paths, a piston slidably mounted in said casing to control flow through said paths, a second piston slidably mounted in said casing, said two pistons forming a chamber with said casing, said chamber having an inlet passage through said second piston and an outlet passage of which one comprises a friction tube and the other comprises an orifice, a conduit with which said casing communicates, said inlet passage being in communication with said conduit, a spring opposing movement of said first piston away from said second piston, a spring opposing movement of said second piston toward said first piston, and valve means responsive to movement of said second piston to maintain constant pressure differential across said inlet passage.

7. In a fluid system, two fluid paths, a heat exchange device in one path, a casing communicating with said paths, a piston slidably mounted in said casing to control flow through said paths, a second piston slidably mounted in said casing, said two pistons forming a chamber with said casing, said chamber having an inlet passage through said second piston and an outlet passage of which one comprises a friction tube and the other comprises an orifice, a conduit with which said casing communicates, said inlet passage being in communication with said conduit, a spring opposing movement of said first piston away from said second piston, a spring opposing movement of said second piston toward said first piston, and means including said second piston for maintaining constant pressure differential across said inlet passage.

8. In a fluid system, two fluid paths, a heat exchange device in one path, a casing communicating with said paths, a piston slidably mounted in said casing to control flow through said paths, a second piston slidably mounted in said casing, said two pistons forming a chamber with said casing, said chamber having an inlet passage in said piston and an outlet passage, one of said passages comprising a friction tube and the other of said passages comprising an orifice, a conduit with which said casing communicates, said casing having a port across which said second piston is reciprocable to control flow into said casing, means for flowing fluid from said conduit to said casing port, and a spring tending to oppose movement of the first piston away from said second piston.

9. In a fluid system, two fluid paths, a heat exchange device in one path, a casing communicating with said paths, a piston slidably mounted in said casing to control flow through said paths, a second piston slidably mounted in said casing, said two pistons forming a first chamber with said casing and said second piston forming a second chamber with said casing, a conduit with which said casing communicates, means for flowing fluid from said conduit to said first chamber, said second chamber having an inlet passage through said second piston and an outlet passage of which one passage comprises a friction tube and the other passage comprises an orifice, a spring opposing movement of the second piston toward the first piston, a spring opposing movement of the first piston away from the second piston, and valve means responsive to the movement of said second piston to maintain constant pressure differential across said inlet passage.

10. In a fluid system, two fluid paths, a heat exchange device in one path, a casing communicating with said paths, a piston slidably mounted in said casing to control flow through said paths, a second piston slidably mounted in said casing, said two pistons forming a first chamber with said casing and said second piston forming a second chamber with said casing, a conduit with which said casing communicates, means for flowing fluid from said conduit to said first chamber, said second chamber having an inlet passage through said second piston and an outlet passage of which one passage comprises a friction tube and the other passage comprises an orifice, a spring opposing movement of the second piston toward the first piston, a spring opposing movement of the first piston away from the second piston, and means including said second piston for maintaining constant pressure differential across said inlet passage.

11. In a fluid system, two fluid paths, a heat exchange device in one path, a casing communicating with said paths, a piston slidably mounted in said casing to control flow through said paths, a second piston slidably mounted in said casing, said two pistons forming a first chamber with said casing and said second piston forming a second chamber with said casing, said casing having a port across which said second piston is reciprocable to control flow into said casing, a conduit with which said casing communicates, means for flowing fluid from said conduit to said casing port, said second chamber having an inlet passage through said second piston and an outlet passage of which one passage comprises a friction tube and the other passage comprises an orifice, a spring opposing movement of the second piston toward the first piston, and a spring opposing movement of said first piston away from said second piston.

12. In a fluid system, two fluid paths, a heat exchange device in one path, a conduit with which said paths communicate, a valve movable to and fro to control flow through said paths, a chamber having two movable walls provided with ports, one of said ports comprising a friction tube and the other port comprising an orifice, means for flowing fluid from said conduit into said chamber through one of said ports and out of said chamber through the other port, a spring tending to oppose movement of the inlet port wall in one direction, a second valve for controlling the pressure differential across said inlet port, said second valve being connected to and operated by said inlet port wall and said first valve being conjunctively related to said outlet port wall.

13. In a fluid system, a pair of fluid paths, a heat exchange device in one path, a conduit with which said paths communicate, a valve movable to and fro to control flow through said paths, a bellows member having one fixed wall and one movable wall, a passage extending through said movable wall, an inlet in said stationary wall, means for flowing fluid from said conduit to said inlet, a second valve controlling said inlet, said valve being connected to and operated by said movable wall, a spring tending to oppose movement of said movable wall in one direction, a second bellows member enclosing said first bellows member and having a fixed wall and a movable wall conjunctively related to said first valve, and an outlet passage in the movable wall of said second bellows member, one of said passages being a friction tube and the other an orifice.

14. In a fluid system comprising a pair of fluid paths, a heat exchange device in one path, a conduit with which said paths communicate, a valve movable to and fro to control flow through said paths, a cylinder, a piston in said cylinder, a passage through the head of said piston, said cylinder having a port across which said piston is reciprocable to control flow into said cylinder, means for flowing fluid from said conduit to the cylinder port, a spring tending to oppose movement of the piston in one direction, a bellows member enclosing said cylinder and having a fixed wall and a movable wall conjunctively related to said valve, and an outlet passage for said bellows member, one of said passages being a friction tube and the other passage being an orifice.

15. In a fluid system, two fluid paths, a heat exchange device in one path, a casing communicating with said paths, a piston valve in said casing for controlling flow through said paths, a conduit with which said casing communicates, a piston slidably mounted in said casing, an inlet passage extending through the head of the piston, said casing having a port across which said piston is reciprocable to control flow into said casing, means for flowing fluid from said conduit to the casing port, a spring tending to oppose movement of the piston in one direction, an outlet passage through which fluid discharges from the space between said piston and piston valve, said piston valve being adapted to be acted upon by fluid flowing between said passages, and a spring tending to oppose movement of said valve piston in one direction, one of said passages being an orifice and the other passage being a friction tube.

16. In a fluid system, two fluid paths, a heat exchanger in one path, a conduit communicating with said paths, a chamber having an inlet passage communicating with said conduit and an outlet passage, one of said passages comprising a friction tube and the other passage comprising an orifice, and valve means responsive to the pressure in said chamber for maintaining constant pressure differential across said inlet passage and controlling flow through said heat exchanger.

17. In a fluid system, a fluid path divided over a portion of its length into two channels, a heat exchanger in one channel, a branch path for by-passing fluid from said first path, a chamber in said branch path having inlet and outlet passages of which one is a friction tube and the other an orifice, and valve means responsive to the pressure in said chamber for maintaining constant pressure differential across said inlet passage and controlling flow through said heat exchanger.

HARRY T. BOOTH.